United States Patent
Bouteiller et al.

(10) Patent No.: US 7,354,176 B2
(45) Date of Patent: Apr. 8, 2008

(54) LIGHTING AND/OR SIGNALING DEVICE FOR AN AUTOMOBILE

(75) Inventors: Jacques Bouteiller, Bobigny Cedex (FR); Jean-Claude Puente, Bobigny Cedex (FR); Alain Levilain, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/305,143

(22) Filed: Dec. 15, 2005

(65) Prior Publication Data

US 2006/0133086 A1 Jun. 22, 2006

(30) Foreign Application Priority Data

Dec. 17, 2004 (FR) .................................. 04 13525

(51) Int. Cl.
*F21V 29/00* (2006.01)
(52) U.S. Cl. ..................... 362/267; 362/546; 362/549
(58) Field of Classification Search ................ 362/267, 362/310, 311, 329, 520, 546, 549
See application file for complete search history.

(56) References Cited

U.S. PATENT DOCUMENTS

| | | | | |
|---|---|---|---|---|
| 5,560,706 | A | | 10/1996 | Yamazaki et al. .......... 362/267 |
| 5,909,957 | A | * | 6/1999 | Skirha et al. ................ 362/546 |
| 5,934,799 | A | * | 8/1999 | Suzuki et al. ................ 362/267 |
| 6,318,883 | B1 | | 11/2001 | Sugiyama et al. .......... 362/267 |
| 6,478,451 | B2 | | 11/2002 | Akiyama et al. |
| 6,592,239 | B1 | | 7/2003 | Akiyama et al. ............ 362/267 |
| 2004/0080944 | A1 | * | 4/2004 | Ferguson et al. ............ 362/267 |
| 2004/0200569 | A1 | | 10/2004 | Weiblen et al. .......... 156/272.8 |

FOREIGN PATENT DOCUMENTS

EP 0 850 749 A2 7/1998
WO 03/004211 A2 1/2003

OTHER PUBLICATIONS

Search report for corresponding FR 04 13 525 dated Aug. 4, 2005.

* cited by examiner

*Primary Examiner*—Stephen F Husar
(74) *Attorney, Agent, or Firm*—Morgan & Finnegan, LLP

(57) ABSTRACT

The object of the invention is a method of fixing a outer lens to the housing of a lighting and/or signaling device for an automobile, the housing being provided, in the area of joining with the outer lens, with a bonding groove, a method during which adhesive which is not totally hardened is disposed in the said groove, the foot of the outer lens is inserted in a groove so that it is outer lens with adhesive over a sufficient height, the adhesive hardens in particular to fix the foot of the outer lens in the bonding groove. At least one step of temporary fixing of the outer lens to the housing is provided, after the insertion of the foot of the outer lens in the bonding groove and after any hardening of the adhesive.

18 Claims, 2 Drawing Sheets

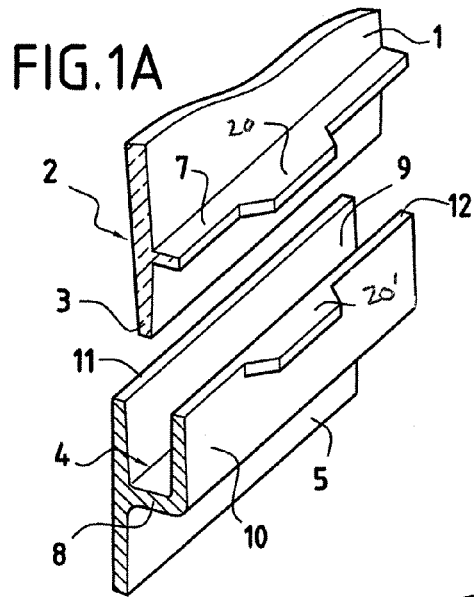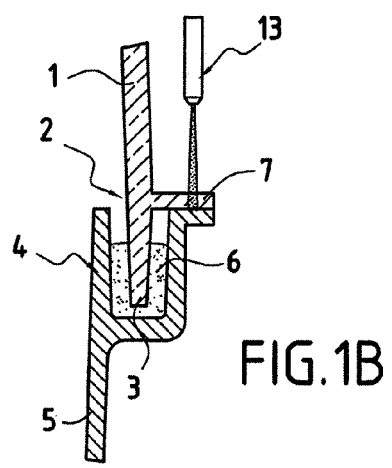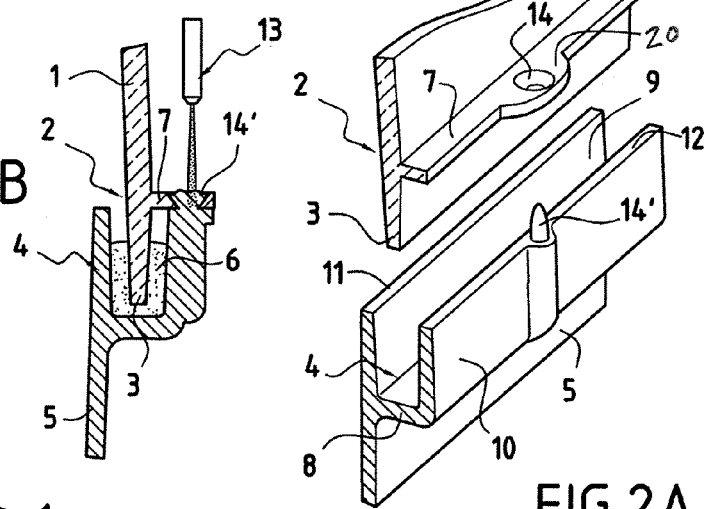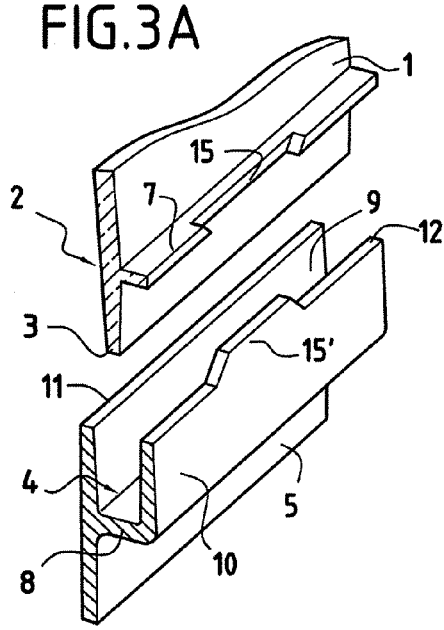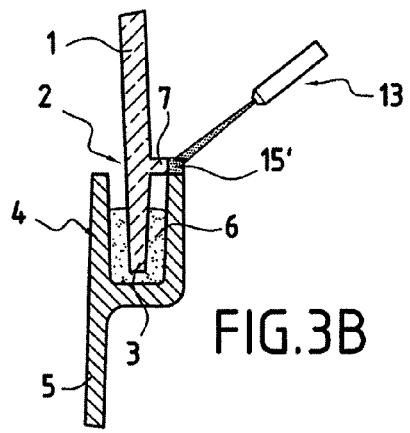

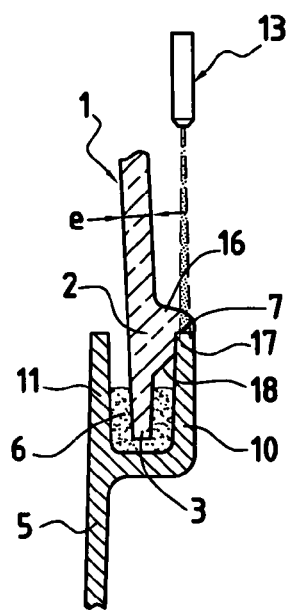
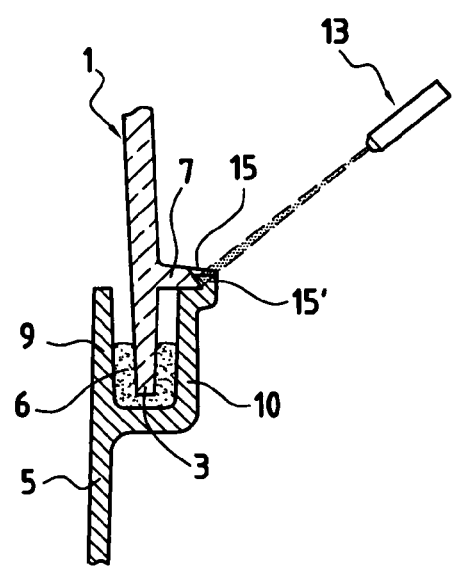
FIG.4  FIG.5
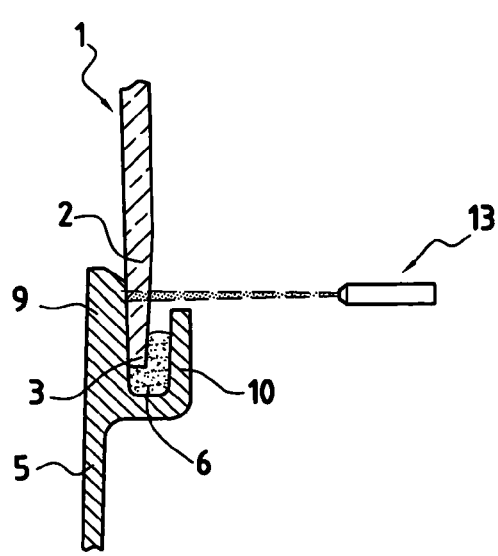
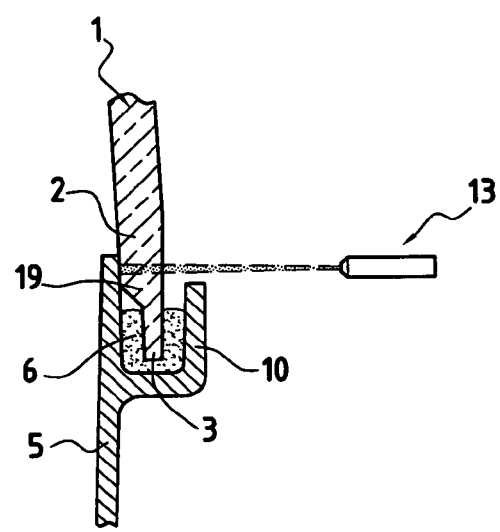
FIG.6  FIG.7

LIGHTING AND/OR SIGNALING DEVICE FOR AN AUTOMOBILE

FIELD OF THE INVENTION

The invention relates to a lighting and/or signaling device for an automobile, of the sidelight or headlight type. In a manner known per se, this type of device comprises a certain number of elements with an optical function, such as light sources, dioptric components of the lens type, screens, masks, reflectors, electrical connection elements, etc. These components are disposed in a housing, which is closed by a outer lens, provided or not with serrations, which is made from glass or, more normally these days, from polymer material of the polycarbonate or polymethyl methacrylate type.

BACKGROUND OF THE INVENTION

The invention concerns more particularly the method of fixing the outer lens to the housing. It is known how to provide, along the edge of the housing where the outer lens is to be fixed, what is referred to as a bonding groove, which defines a channel intended to receive a so-called structural adhesive, that is to say an adhesive which has a dual property: the property of providing the watertightness of the device in all its forms, and the property of effectively fixing the outer lens to the housing. This type of adhesive is deposited in the groove in the form of a paste of appropriate viscosity, and the edge of the outer lens is then disposed in the groove, so that it is entirely covered by the adhesive on its edge and its two faces, over a sufficient height. The adhesive then has a few minutes to harden, and finally to fix the glass definitively.

However, this lapse of time, between the moment when the outer lens is disposed in the bonding groove and the moment when the adhesive has hardened, is a tricky period: this is because it is necessary for the outer lens to be initially correctly positioned in the groove and for it to keep its correct positioning until the adhesive is hardened. For this purpose, recourse may be had to support and positioning means provided on the housing and/or on the outer lens: for example, at the foot of the outer lens (the "foot" of the outer lens being the area of the outer lens intended to be fixed to the housing) a protuberant area is provided which cooperates with one of the edges of the bonding groove of the housing. It has turned out that this type of means could prove to be insufficient.

There is known from the patent U.S. Pat. No. 6,478,451 a method of fixing the outer lens to the housing where there is no bonding groove on the housing: the shape, for example in a bevel or in a point with two facets, of the edge of the outer lens is adapted to the complementary shape of the edge of the housing to which the outer lens is to be fixed. Then the edge of the glass is welded by radiation to the edge of the housing whilst simultaneously exerted a mechanical pressure between outer lens and housing in the junction area of the two parts. However, this technique is not devoid of drawbacks: it requires laser treatment along the whole periphery of the housing if it is wished to ensure watertightness of the housing, which may take too long. It also requires good chemical compatibility between the outer lens and the housing, and mechanical press means to be positioned precisely. It is not certain that it is thus possible to ensure, after treatment, perfect watertightness at the outer lens/housing junction, even if the mechanical fixing is ensured.

The aim of the invention is then a novel method of fixing the outer lens on the housing of a lighting and/or signaling device for a vehicle, which is better, and which is in particular more reliable than in the known technical solutions, which guarantees in particular better positioning of the outer lens during the bonding proper, and/or which simplifies the fixing operation or the design of the elements to be bonded.

SUMMARY OF THE INVENTION

The object of the invention is a method of fixing a outer lens to the housing of a lighting and/or signaling device for an automobile, the housing being provided with a bonding groove in the area of junction with the outer lens, a method during which
- not totally hardened adhesive is disposed in said groove,
- the foot of the outer lens is inserted in the groove so that it is covered with adhesive over a sufficient height,
- the adhesive hardens, in particular to fix the foot of the outer lens in the bonding groove, and after the insertion of the foot of the outer lens in the bonding groove and before any hardening of the adhesive, at least one temporary step of fixing the outer lens to the housing is provided.

Within the meaning of the invention, "harden" means the fact that the adhesive can change state, can be modified in particular by cross-linking and/or polymerization of the polymer or polymers that it contains. More generally, this term implies that the adhesive can acquire the mechanical characteristics necessary for the complete immobilization of the outer lens on the housing.

It may also be envisaged that this adhesive would not or not totally assume the role of means of definitive fixing of the outer lens to the housing, and that, in particular, it would be supplemented at least partly by the temporary treatment in question which, in fact, is also used for the definitive fixing of the two components.

The invention therefore proposes to provide a holding in position of the outer lens in the housing as long as the adhesive is not yet fulfilling its fixing role, which prevents any unwanted relative movement between outer lens and housing during this period of time, which is generally, depending on the adhesive chosen, around several minutes.

Advantageously, the temporary fixing step uses treatment by laser radiation able to weld the outer lens to the housing locally. This type of treatment is effective, and is very flexible: the laser treatment means adapt to many forms and many types of material. In the present case, the majority of the transparent materials (in the visible range) made from polymer used to make vehicle headlight or sidelight outer lens are also transparent to the radiation emitted by the lasers: it is therefore possible if necessary to treat the housings "through" the thickness of their outer lens.

The treatment by laser radiation preferably takes place so that, locally, the material of the housing, at or close to the bonding groove, melts in contact with the outer lens. Either the two materials are already in contact before treatment or, through their respective configurations, they become so by virtue of said treatment.

The local fusion takes place for example on one of the edges and/or one of the faces of the sides of the bonding groove in the housing, in an area devoid of adhesive.

The laser treatment can be effected on the material of the housing through the outer lens (since it is generally transparent to laser radiation, as mentioned above), in particular through the nominal thickness of the outer lens or through an area of abutment of the foot of the outer lens on one of the sides of the bonding groove in the housing.

The treatment by laser radiation is preferably effected locally on an area of the housing facing an area of the outer lens with complementary shapes. Thus the mutual adhesion of the two materials is promoted.

It may be a case in particular of complementary shapes of the cavity type able to receive a protuberant element of the stud type, a crenellation able to fit in a scallop, or stepped areas able to fit together.

Advantageously, the area of the housing treated by laser radiation comprises a protuberant area of the stud or crenellation type disposed on or close to the edge of one of the sides of the bonding groove, and coming to be inserted, when the foot of the outer lens is inserted in the groove, in a cavity or scallop provided in the foot of the outer lens.

According to one embodiment, the cavity or scallop provided in the foot of the outer lens is situated in the area of abutment of the foot of the outer lens on one of the sides of the bonding groove in the housing.

The complementary areas of the housing and outer lens may comprise a protuberant element on the housing of the stud or crenellation type and a cavity or scallop provided in the foot of the lens, the respective dimensions and shapes of which are chosen so that, after at least partial fusion of said protuberant element under the effect of the laser radiation and then cooling thereof, a mechanical attachment is created between said element and said cavity. This is particularly useful when the chemical compatibility between the material making up the outer lens and that making up the housing is low since, in this case, even the local fusion of the housing in contact with the outer lens may not create sufficient mutual adhesion to fix the outer lens to the housing. It is thus possible to choose a cavity on the outer lens with for example a frustoconical shape, associated with a stud on the housing of cylindrical shape, or any other shapes such that the protuberant element of the housing, once treated by laser, adopts a shape which definitively fits in the cavity in the outer lens by an undercut effect.

The invention also concerns the lighting and/or signaling device obtained by the method described above. It also concerns an automobile lighting and/or signaling device, of the headlight type, comprising a housing closed by a outer lens, such that the outer lens is fixed to the housing by insertion of the foot of the outer lens in a bonding groove provided on the housing in which adhesive is disposed, with areas of local welding of the housing to the foot of the outer lens, the said areas being situated on one of the edges and/or one of the faces of one of the sides of the bonding groove in the housing.

Advantageously, the outer lens is welded locally to the housing at the foot of the outer lens, in particular in area of abutment of the foot of the outer lens on one of the sides of the bonding groove in the housing. The local welding areas are in particular in the form of at least protuberant element of the stud or crenellation type, in particular disposed on or close to the edge of one of the sides of the bonding groove, at least partially inserted in a cavity provided in the foot of the outer lens.

The cavity provided in the foot of the outer lens is preferably situated in the area of abutment of the foot of the outer lens on one of the sides of the bonding groove in the housing.

The respective shapes of the protuberant element once molded in the cavity and its cavity create a mechanical attachment of the outer lens to the housing.

The foot of the housing may comprise an area of abutment against one of the edges of the bonding groove, and the welding areas are located at the interface between abutment area and bonding groove.

According to a variant, the foot of the outer lens has no abutment area. This is then an outer lens which is more simple to produce. In particular in this case, the foot of the outer lens can be thinned with respect to the nominal thickness of the outer lens, the reduction in thickness being for example progressive and/or carried out by means of a beveled intermediate area.

The invention will be described below with the help of non-limiting examples illustrated by the following figures:

BRIEF DESCRIPTION OF THE DRAWINGS

FIG. 1a, 1b is a representation of a first embodiment of the foot of a outer lens in a headlight housing treated according to the invention.

FIG. 2a, 2b is a representation of a second embodiment of the foot of a outer lens in a headlight housing treated according to the invention.

FIG. 3a, 3b is a representation of a third embodiment of the foot of a outer lens in a headlight housing treated according to the invention.

FIGS. 4 to 7 depict other embodiments of the invention.

DESCRIPTION OF THE PREFERRED EMBODIMENTS

All these figures are schematic and the proportions are therefore not necessarily complied with. The references indicating the same component are repeated from one figure to another.

FIG. 1b is a representation of the part of the outer lens inserted in the housing, FIG. 1a presenting a housing and outer lens foot separately, in an exploded view: the outer lens 1 has an area referred to as the outer lens foot 2 which comprises an end 3 inserted in a groove 4 positioned all along the edge of the housing 5. This groove is intended to receive adhesive 6, which is viscous in the non-crosslinked state and which, once put in the groove 4, hardens by polymerization/crosslinking in 3 to 10 minutes depending on the adhesive. Once the adhesive 6 is put in the groove 4 the end 3 of the outer lens foot is then inserted in the groove so that the said end is coated with adhesive over several millimeters on each of its faces and on its edge. The outer lens foot is then provided with an area 7 referred to as the abutment area, which is a protuberant area present over the entire periphery of the lens and disposed in a plane substantially perpendicular to that passing through the end 3 of the outer lens foot. In the context of the invention, this abutment area 7 is provided locally with extensions 20 always in a plane approximately perpendicular to the plane of the end 3. These extensions 20 have a substantially trapezoidal shape, recalling the shape of a crenellation. In an equivalent manner, they could have a surface of the square, rectangular, polygonal or rounded type. The bonding groove 4 in the housing, for its part, is composed of a bottom 8 and two sides 9, 10 each having an edge 11, 12. The outermost side 10 has an edge 12 on which the abutment area 7 of the outer lens can effectively bear and permit the suitable positioning of the end of the outer lens foot in the groove. This edge has also been modified so as to have extensions 20' with shape and orientation in space identical and similar to those of the extensions 20 of the outer lens. In this way, when the abutment area 7 comes into contact with the edge 12 of the side 10 of the bonding groove 4, the extensions 20 and 20' also fit together, offering a supplementary abutment surface for the glass. It is in these areas 20' that the treatment with the laser 13 is carried out, by means of an articulated arm, not shown, through the thickness of the abutment area 7: the areas 20' melt at least superficially and, in cooling, adhere to the areas 20 of the outer lens in order to provide a housing/outer lens fixing point locally. At least three pairs of complementary areas 20, 20' are provided, the articulated arm on which the laser 13 is mounted moving from one to the other successively. Alternatively, it is the housing/glass assembly that can be moved with respect to the laser 13, which remains fixed.

The other figures show other variants of the invention: in figure 2a, 2b, there are this time, on the external side 12 of the bonding groove 4, studs 14' molded in the mass. These studs correspond to extension 20 to the abutment area 7 this time with a smaller surface and with a through cavity 14 in them. This cavity preferably has cylindrical walls that are splayed (upwards), with respect to the stud 14' coming to be inserted (through the bottom) in said cavity. "Top" and "bottom" are of course conventions for clarifying understanding of the invention. There too, the laser treatment at least partially melts the stud on the housing, which adheres/collapses against the walls of the cavity before solidifying. Once solidified, the stud, whose walls at least partially come to follow the walls of the cavity 14, are mechanically trapped in the said cavity: there is a mechanical attachment between the two elements which completes or supplements the attachment by adhesion between stud and cavity.

FIG. 3 shows yet another variant: this time, the abutment area 7 has not extensions, but scallops 15, in which extensions 15' of the edge 12 can fit substantially perpendicular in the plane of the side 10, with the shape of the crenellation type. These crenellations 15' are treated by laser without even having to pass through a thickness of outer lens in this case. The crenellations, under the effect of the laser radiation, tend to collapse by at least partial fusion and, in fact, come to adopt the contours of the scallops 15, the walls of which are straight upwards (the crenellations preferably having a surface with a trapezoidal or pseudo-trapezoidal shape). As in the previous case, there is then a sort of mechanical attachment between scallop and crenellation, once the crenellation has solidified.

The following figures are variants of the examples already illustrated in FIGS. 1 to 3: in FIG. 4, the outer lens foot has an abutment area 7 which has a particular shape with a nose 16 at the top part, and a corner 17 at the bottom part adapting to the edge 12 and to the internal wall of the external side 10 of the bonding groove. The outer lens foot has, below this corner 17, a beveled area 18. The end 3 of the outer lens foot is thinned compared with the nominal thickness e of the outer lens. There is therefore here an area of contact of the bonding groove with the outer lens which is not limited to the edge 12 but which also comprises part of the walls of one of the sides of the bonding groove.

FIG. 5 depicts in more detail an association between crenellation and scallops similar to FIG. 3.

In FIG. 6, the outer lens foot 2 no longer has an abutment area. And the area of the housing treated by the laser is situated on the internal side 9 of the bonding groove rather than on its external side. The area of contact between outer lens and housing treated with the laser is therefore situated on the external face of the internal side 9 of the groove facing the internal face of the end 3 of the outer lens. "Internal" and "external" are to be understood according to the positioning of the component considered with respect to the inside of the headlight housing.

In FIG. 7 there is a variant of the example according to FIG. 6: there is still the area of contact between outer lens and housing disposed along the external wall of the internal side 9 of the groove, but the outer lens foot comprises a beveled area 19, which is an area of transition towards a thinned end 3 of the outer lens.

It can therefore be seen that the invention affords many possibilities of implementation. It is in particular possible to have outer lens foot designs with or without an abutment area, thinned or not thinned at its end. It is possible to create a true mechanical attachment in the areas treated by laser, or to be content with mutual adhesion effected during the fusion. It is possible to modulate the number and distribution of the areas treated over the periphery of the housing, by choosing preferably at least three evenly distributed areas.

In some of the embodiments depicted in the figures, it is also possible to see that the abutment areas, when they are provided, at the outer lens foot, are situated in direct contact with part of the bonding groove. It may also be noted that the invention has developed a temporary fixing system without any addition of material of the additional adhesive type: the laser treatment modifies the housing on the surface in order to make it fulfill the role of adhesion agent.

It is also possible, still in the context of the invention, to modify the type of adhesive 6 usually used. It is possible to choose to make it fulfill essentially the role of sealing means, by choosing an adhesive of the mastic type or silicone compound, and to provide sufficient welding points between a housing and a outer lens for these points to provide all or part of the mechanical fixing, both temporary and definitive, between housing and outer lens. It is thus possible to substitute, for an expensive structural adhesive requiring hardening time, an adhesive of the mastic type that is more economical and easy to use.

What is claimed is:

1. A method of fixing a outer lens to the housing of a lighting and/or signaling device for an automobile, the housing being provided, in the area of joining with the outer lens, with a bonding groove, the method comprising:
    (a) disposing an adhesive that is not completely hardened in the groove;
    (b) inserting the foot of the outer lens in the groove so that it is covered with adhesive over a sufficient height;
    (c) at least temporarily fixing the outer lens to the housing after the insertion of the outer lens foot in the bonding groove and before the adhesive is completely hardened, wherein the at least temporarily fixing step uses laser radiation treatment able to weld the outer lens locally to the housing.

2. A method as claimed in claim 1, wherein the laser radiation treatment takes place so that, locally, the material of the housing, at or in the vicinity of the bonding groove, melts in contact with the outer lens.

3. A method as claimed in claim 1, wherein the local fusion takes place on one of the edges and/or one of the faces of the sides of the bonding groove in the housing, in an area devoid of adhesive.

4. A method as claimed in claim 1, wherein the laser treatment takes place on the material of the housing through the outer lens, in particular through the nominal thickness of the outer lens or through an area of abutment of the outer lens foot on one of the sides of the bonding groove in the housing.

5. A headlight as claimed in claim 1, wherein the laser radiation treatment takes place locally on an area of the housing facing an area of the outer lens of complementary shape.

6. A method as claimed in claim 5, wherein the areas respectively of the housing and of the outer lens are complementary in shape, of the cavity type, able to receive a protuberant element of the stud or crenellation type able to fit in a scallop, or stepped areas able to fit together.

7. A method as claimed in claim 1, wherein the area of the housing treated by laser radiation comprises a element of the stud or crenellation type disposed on or in the vicinity of the edge of one of the sides of the bonding groove, and coming to be inserted, when the outer lens foot is inserted in the groove, in a cavity or scallop provided in the outer lens foot.

8. A method as claimed in claim 7, wherein the cavity or the scallop provided in the outer lens foot is situated in the area of abutment of the outer lens foot on one of the sides of the bonding groove in the housing.

9. A method as claimed in claim 6, wherein the complementary areas of the housing and outer lens comprise a protuberant element of the housing of the stud or crenellation type and a cavity or scallop provided in the outer lens foot, the respective dimensions and shapes of which are chosen so that, after at least partial fusion of the said protuberant element under the effect of the laser radiation and then cooling of it, a mechanical attachment is created between said element and said cavity.

10. An automobile lighting and/or signaling device, of the headlight type, comprising a housing closed by a outer lens, wherein the outer lens is fixed to the housing by insertion of the outer lens foot in a bonding groove provided on the housing in which adhesive is disposed with areas of local welding of the housing to the lens foot, said areas being devoid of adhesive and situated at least on one of the edges or on one of the faces of one of the sides of the bonding groove in the housing.

11. An automobile lighting and/or signaling device as claimed in claim 10, wherein the outer lens is welded locally to the housing at the outer lens foot in particular in the area where the outer lens foot abuts on one of the sides of the bonding groove in the housing.

12. An automobile lighting and/or signaling device as claimed in claim 10, wherein the local welding areas are in the form of at least one protuberant element of the stud or crenellation type, in particular disposed on or in the vicinity of the edge of one of the sides of the bonding groove, at least partially inserted in a cavity provided in the outer lens foot.

13. An automobile lighting and/or signaling device as claimed in claim 12, wherein the cavity provided in the outer lens foot is situated in the area of abutment of the outer lens foot on one of the sides of the bonding groove in the housing.

14. An automobile lighting and/or signaling device as claimed in claim 12, wherein the respective shapes of the protuberant element, once welded in the cavity, and of its cavity create a mechanical attachment of the outer lens to the housing.

15. An automobile lighting and/or signaling device as claimed in claim 10, wherein the outer lens foot comprises an area of abutment against one of the edges of the bonding groove, and in that the welding areas are located at the interface between abutment area and bonding groove.

16. An automobile lighting and/or signaling device as claimed in claim 10, wherein the outer lens foot has no abutment area.

17. An automobile lighting and/or signaling device as claimed in claim 10, wherein the outer lens foot is thinned compared with the nominal thickness of the outer lens.

18. An automobile lighting and/or signaling device as claimed in claim 17, wherein the outer lens foot is thinned when compared with the nominal thickness of the outer lens, the reduction in thickness being progressive and/or implemented by means of a beveled intermediate area.

* * * * *